(12) United States Patent
Bodman et al.

(10) Patent No.: US 10,785,331 B2
(45) Date of Patent: Sep. 22, 2020

(54) SYSTEMS AND METHODS FOR DETECTING METRICS AND RANKING APPLICATION COMPONENTS

(71) Applicant: ServiceNow, Inc., Santa Clara, CA (US)

(72) Inventors: Mark David Bodman, Thorndale, TX (US); Julie Vittengl, Gansevoort, NY (US); Lionel Christian Berger, Vevey (CH)

(73) Assignee: ServiceNow, Inc., Santa Clara, CA (US)

( * ) Notice: Subject to any disclaimer, the term of this patent is extended or adjusted under 35 U.S.C. 154(b) by 120 days.

(21) Appl. No.: 16/058,121

(22) Filed: Aug. 8, 2018

(65) Prior Publication Data

US 2020/0053175 A1 Feb. 13, 2020

(51) Int. Cl.
  *G06F 15/16* (2006.01)
  *H04L 29/08* (2006.01)
  *H04L 29/06* (2006.01)

(52) U.S. Cl.
  CPC .............. *H04L 67/22* (2013.01); *H04L 67/32* (2013.01); *H04L 67/42* (2013.01)

(58) Field of Classification Search
  USPC ......................................................... 709/219
  See application file for complete search history.

(56) References Cited

U.S. PATENT DOCUMENTS

| | | |
|---|---|---|
| 6,321,229 B1 | 11/2001 | Goldman |
| 6,816,898 B1 | 11/2004 | Scarpelli |
| 7,020,706 B2 | 3/2006 | Cates |
| 7,716,353 B2 | 5/2010 | Golovinsky |
| 7,769,718 B2 | 8/2010 | Murley |
| 7,925,981 B2 | 4/2011 | Pourheidari |
| 8,151,261 B2 | 4/2012 | Sirota |
| 8,402,127 B2 | 3/2013 | Solin |

(Continued)

FOREIGN PATENT DOCUMENTS

| | | |
|---|---|---|
| WO | 2012059400 A1 | 5/2012 |
| WO | 2016/149080 A1 | 9/2016 |

OTHER PUBLICATIONS

Extended European Search Report for European Patent Application No. 19190699.9 dated Dec. 16, 2019; 10 pgs.

*Primary Examiner* — Alicia Baturay
(74) *Attorney, Agent, or Firm* — Fletcher Yoder, P.C.

(57) ABSTRACT

A hosted client instance is provided over a network interface for communicatively coupling with a remote client device, the hosted client instance including a first plurality of application components for performing a plurality of actions associated with the hosted client instance. A metric is set to optimize one or more actions associated with the hosted client instance based on input from a user. One or more application components are detected based on the metric from among a second plurality of application components available on a resource server. The detected one or more application components are ranked based on: (i) a maturity score of each of the detected one or more application components; and (ii) dependency data indicating an operational dependency of each of the detected one or more application components. The ranked one or more application components are presented in a ranked order to a user.

20 Claims, 11 Drawing Sheets

| App | Value stream | Function | Agility | Risk | Cost | Value(s) |
|---|---|---|---|---|---|---|
| GRC | S2P | Policy | 3 | 10 | 2 | Improves Risk Measure per CI |
| ITSM Knowledge | R2F | Engagement | 7 | 1 | 9 | Improves self-service |
| ITOM Discovery | D2C | Config | 4 | 3 | 5 | Increases visibility for as-is |
| ITSM Catalog | R2F | Catalog | 8 | 2 | 4 | Improves self-service |
| APM | S2P | EA | 4 | 6 | 8 | Improves planed impact analysis |
| Surveys | R2F | Demand | 9 | 2 | 2 | Improves satisfaction planning |
| PPM | R2D | Project | 8 | 5 | 5 | Improves project delivery |
| PPM | S2P | Demand | 7 | 5 | 6 | Improves alignment to business |
| ITFM | S2P | SPM | 1 | 2 | 10 | Improves cost controls |
| SPM | S2P | SPM | 5 | 5 | 5 | Improves planed Impact analyses |

(56) References Cited

U.S. PATENT DOCUMENTS

| | | |
|---|---|---|
| 8,646,093 B2 | 2/2014 | Myers |
| 8,832,652 B2 | 9/2014 | Mueller |
| 9,098,322 B2 | 8/2015 | Apte |
| 9,317,327 B2 | 4/2016 | Apte |
| 9,354,865 B2* | 5/2016 | Fiebig .................. G06F 8/70 |
| 9,363,252 B2 | 6/2016 | Mueller |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 9,819,729 B2 | 11/2017 | Moon |
| 2007/0214154 A1* | 9/2007 | Ducatel ............... G06F 16/951 |
| 2008/0126147 A1* | 5/2008 | Ang ................ G06Q 10/0639 |
| | | 705/7.38 |
| 2010/0325122 A1 | 12/2010 | Yassin |
| 2011/0066476 A1 | 3/2011 | Lewis |
| 2012/0011157 A1* | 1/2012 | Mauclaire ............... G06F 8/10 |
| | | 707/777 |
| 2013/0173388 A1* | 7/2013 | Le ..................... G06Q 30/0256 |
| | | 705/14.54 |
| 2014/0279787 A1 | 9/2014 | Cheng et al. |
| 2015/0193246 A1 | 7/2015 | Luft |
| 2017/0371650 A1 | 12/2017 | Li et al. |
| 2019/0379759 A1* | 12/2019 | Bellinger ............. H04L 67/306 |

\* cited by examiner

FIG. 5

| | A | B | E | F | G | H | I |
|---|---|---|---|---|---|---|---|
| 1 | Value stream | Functional Comp | Criteria | Primary Product | Secondary Product | Functional Coverage | Partner Product |
| 9 | S2P | Demand | Shall associate one or more Requirements (user stories, use-cases, business rules, etc.) to a Portfolio backlog item if a Requirement functional component exists. | Demand Management | | 100% | |
| 10 | S2P | Enterprise Architecture | Shall create and manage long-term IT investment and execution plan-of-action. | Demand Management | IT Financial Planning | 100% | |
| 11 | S2P | Enterprise Architecture | Shall identify strategic IT architectural components based on current business vision, strategy, goals, and requirements. | Application Portfolio Management | Software Asset Manage | 75% | |
| 12 | S2P | Enterprise Architecture | Shall develop target state business, information, application, technology, and security blueprints based on strategies, principles, and policies. | Application Portfolio Management | Business Planning Porta | 25% | Ins-Pi Designer |
| 13 | S2P | IT Investment Portfolio | Shall be the authoratative source for all IT invenstments requested over a given time period. | Project Management | | 100% | |
| 14 | S2P | IT Investment Portfolio | Shall manage the entire IT investment lifecycle. | Project Management | | 100% | |
| 15 | S2P | IT Investment Portfolio | Shall receive proposed IT investments for development from the Proposal functional component. | Project Management | | 100% | |

FIG. 7

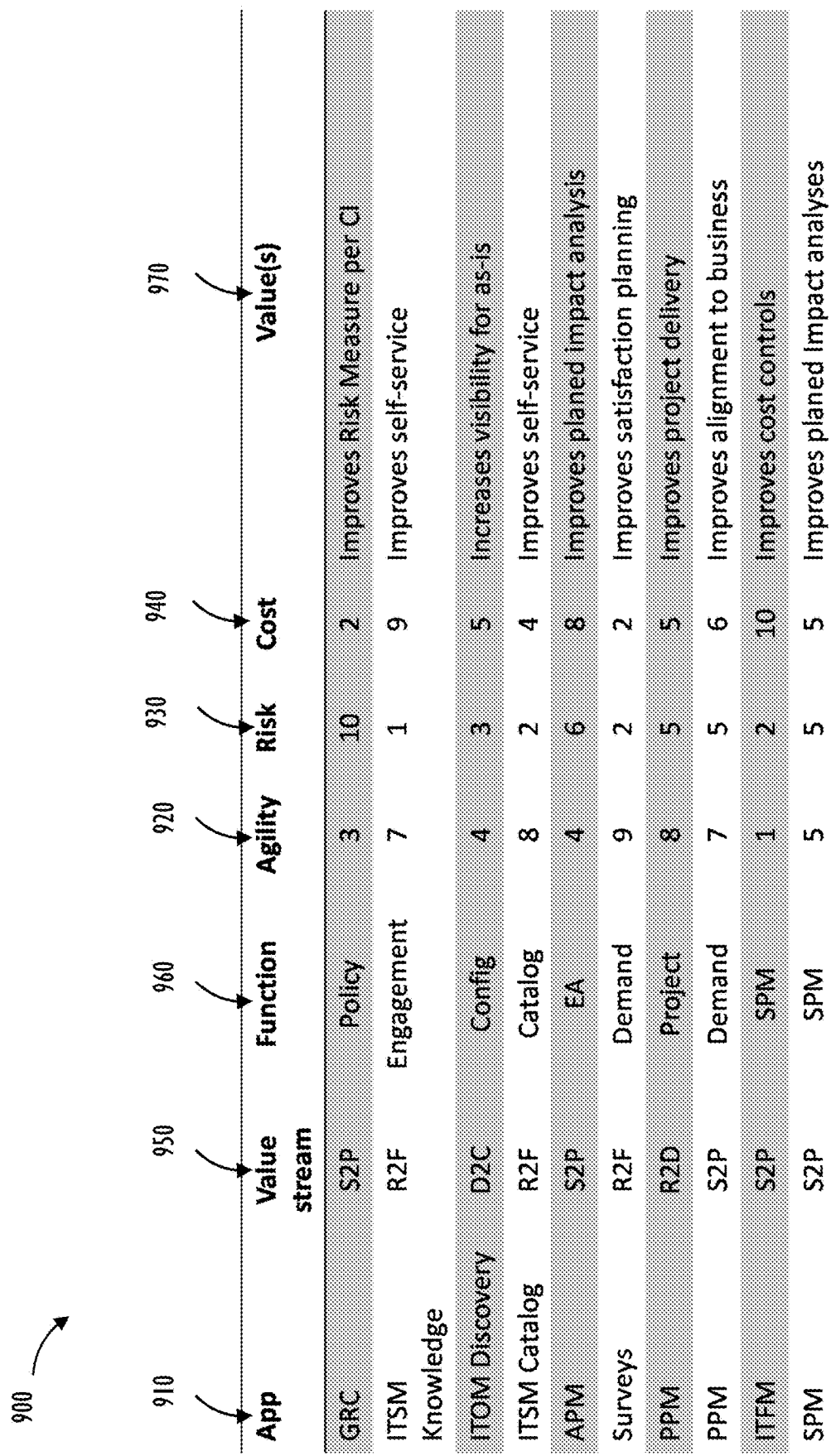

FIG. 9

| App | Value stream | Function | Agility | Risk | Cost | Value(s) |
|---|---|---|---|---|---|---|
| GRC | S2P | Policy | 3 | 10 | 2 | Improves Risk Measure per CI |
| ITSM Knowledge | R2F | Engagement | 7 | 1 | 9 | Improves self-service |
| ITOM Discovery | D2C | Config | 4 | 3 | 5 | Increases visibility for as-is |
| ITSM Catalog | R2F | Catalog | 8 | 2 | 4 | Improves self-service |
| APM | S2P | EA | 4 | 6 | 8 | Improves planed impact analysis |
| Surveys | R2F | Demand | 9 | 2 | 2 | Improves satisfaction planning |
| PPM | R2D | Project | 8 | 5 | 5 | Improves project delivery |
| PPM | S2P | Demand | 7 | 5 | 6 | Improves alignment to business |
| ITFM | S2P | SPM | 1 | 2 | 10 | Improves cost controls |
| SPM | S2P | SPM | 5 | 5 | 5 | Improves planed impact analyses |

SYSTEMS AND METHODS FOR DETECTING METRICS AND RANKING APPLICATION COMPONENTS

TECHNICAL FIELD

Embodiments described herein generally relate to cloud computing and in particular to systems, methods and computer-readable mediums (programs) for generating ordered recommendations of application components for implementation on a cloud platform based on capability improvement priorities of an enterprise.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

The enterprise may utilize a variety of SaaS and/or PaaS based software applications and application components (e.g., plugins, functionalities, features, and the like) that are deployed on an instance hosted in the cloud for the enterprise. Various users (e.g., process owners, service managers, helpdesk managers, IT staff, analysts, development or project managers, management staff) associated with the enterprise may utilize the applications and components deployed on the cloud platform to access, provide or manage various capabilities such as services, processes, or functions related to the enterprise. The enterprise may wish to mature its overall practice or capabilities and accelerate digital transformation by leveraging the cloud instance platform and understanding how the platform can enable the enterprise to achieve its strategic objectives and goals. However, the enterprise may be unaware of all applications and components (including third party apps) that may be available for implementation and use on the instance platform and the value proposition of the components. Further, the enterprise may not fully implement applications and components that already deployed on the instance platform and that the enterprise is already entitled to.

Given the many applications and components and limited exposure to every possible application and component that may be deployed and implemented on the instance platform, the enterprise may unknowingly fail to realize full value of the instance platform. In order to optimize and effectively utilize the instance platform, the enterprise may rely on hired consultants to understand its enterprise transformation objectives, provide a roadmap for service management strategy, guide investing decisions, prioritize metrics and capability areas for maturing through digital transformation, and identify the "best" applications and components that are most aligned with the goals and objectives of the enterprise. However, the enterprise may incur costs in acquiring these consultation services. A better approach is desirable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes providing, with one or more hardware processors, a hosted client instance over a network interface for communicatively coupling with a remote client device, the hosted client instance including a first plurality of application components for performing a plurality of actions associated with the hosted client instance; setting, with the one or more hardware processors, a metric to optimize one or more actions associated with the hosted client instance based on input from a user; detecting, with the one or more hardware processors and based on the metric, one or more application components from among a second plurality of application components available on a resource server; ranking, with the one or more hardware processors, the detected one or more application components based on: (i) a maturity score of each of the detected one or more application components; and (ii) dependency data indicating an operational dependency of each of the detected one or more application components; and presenting, with the one or more hardware processors, the ranked one or more application components in a ranked order to a user.

In another embodiment, the method may be embodied in computer executable program code and stored in a non-transitory storage device (computer-readable recording medium). In yet another embodiment, the method may be implemented on a cloud-based computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIGS. 4-5 show screen shots of graphical user interfaces (GUIs) 400 and 500 illustrating monitored metrics and associated monitored metrics in accordance with one or more disclosed embodiments.

FIG. 7 illustrates artifact 700 showing exemplary mapping data of standardized capabilities of a structured framework mapped to respective applications, application components, and third party apps in accordance with one or more disclosed embodiments.

FIG. 9 illustrates artifact 900 showing exemplary output data of ranked application components, associated respective standardized capabilities or functions of a structured framework and corresponding metadata in accordance with one or more disclosed embodiments.

DESCRIPTION OF EMBODIMENTS

Figure 1:
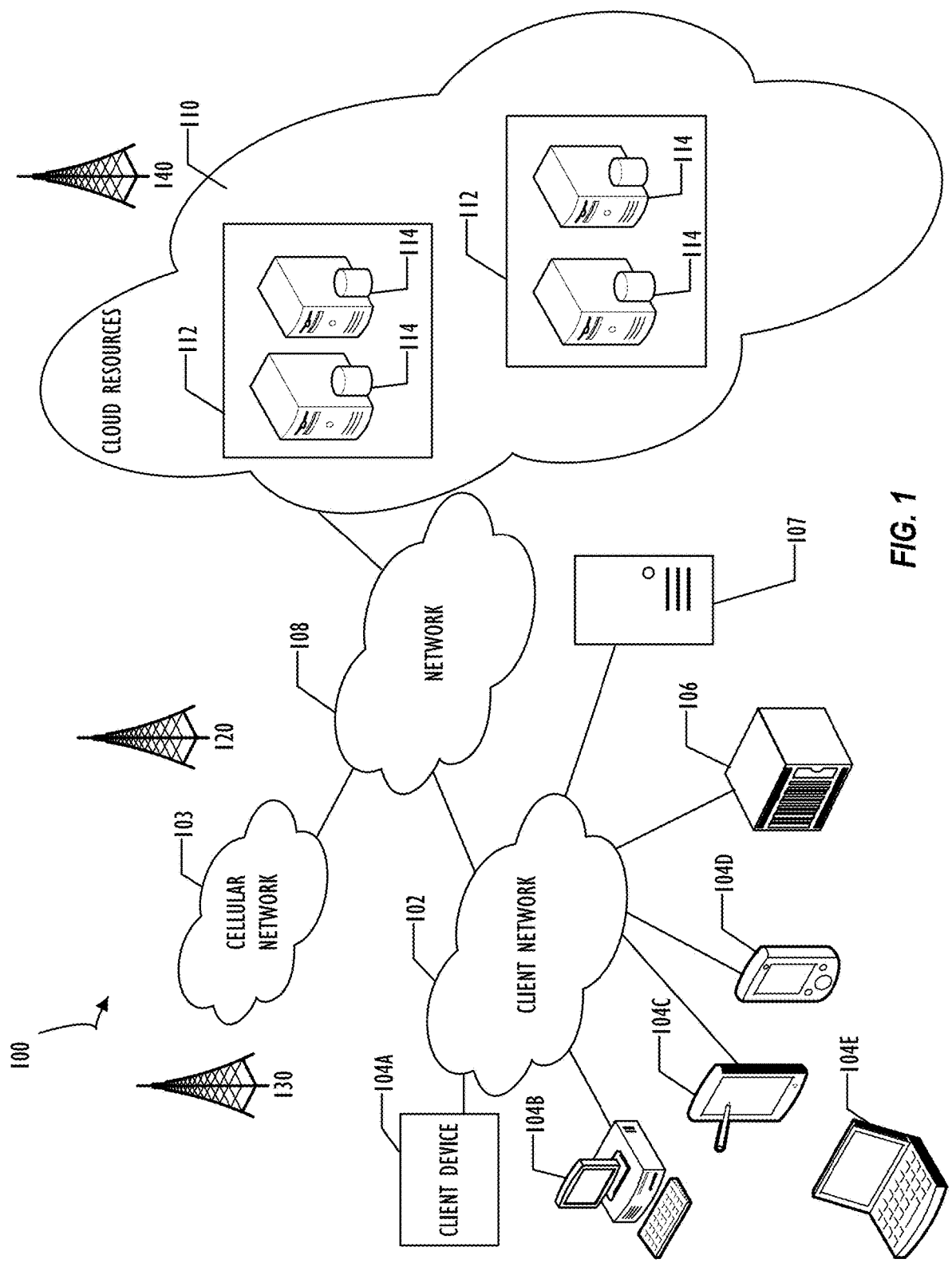
FIG. 1 illustrates a block diagram of cloud computing infrastructure 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to recommending applications (or application components) for installation and use on a hosted client instance by an enterprise to enable the enterprise to achieve its strategic objectives and goals. The ranked application component recommendations may be contextual based on application components (e.g., native platform application components available out of the box, or third party applications or plugins available via an online application store) that are available on a shared resource server and that provide functional coverage to strategic objectives and goals of the enterprise (e.g., capabilities the enterprise is looking to mature, or unit areas the enterprise is looking to invest in (as gleaned from one or more identified metrics)). The recommendations may be ranked in order of priority based on how closely a value proposition of the application component matches the strategic objectives and goals of the enterprise, and based on additional criteria: whether the enterprise is already entitled to (but has not implemented or matured the use of) the recommended application component without incurring additional costs; whether the enterprise is already entitled to operational dependencies (e.g., one or more additional applications or components, or data dependency) of the recommended application component; implementation time (time duration or point in time) of implementing the recommended application component; whether a capability area or enterprise unit (e.g., Finance, Human Resource (HR), Information Technology (IT), Legal, Marketing, Sales) of the application component matches the capability area of the metric representing the strategic objective or goal of the enterprise; and feedback data of customer feedback indicating an effectiveness score of the recommended application component achieving its stated value proposition. The ranking may also be based on empirical data or heuristics regarding an appropriate order in which the recommended application components may be implemented.

The strategic objectives and goals of the enterprise may be input to the hosted client instance by setting one or more metrics (e.g., risk score, agility score, cost score, reinvent supply chain technology, agile financial management, decrease support cost by 50% by FY18, increase standards compliance by 30% by FY18, increase cloud applications by 20% by FY20, and the like) in an application on the instance, or by identifying one or more standardized capabilities of an industry-standard best-practices framework (e.g., Information Technology Infrastructure Library (ITIL) framework, IT4IT™ framework, or the Process Classification Framework (PCF)® of the American Productivity & Quality Center (APQC)). A shared resource server may then be accessed to query a database of all available native or third party applications or components and detect one or more applications or components that may provide functional coverage to the identified metrics or capabilities. By implementing the detected one or more application components, one or more actions (e.g., services, processes, or functions) of the enterprise may be optimized, thereby enabling the enterprise to achieve its objectives and goals. The detection may be performed using metadata associated with the available applications components on the shared resource server, and the detected components may be ranked based on, for example, whether a matured implementation of the detected application component is already available on the platform or a later version of an application component that is already implemented on the platform is now available on the shared resource server. Automatically recommending products (i.e., applications components) for use on the platform may help the enterprise mature its overall practice or capabilities and accelerate digital transformation using data from a variety of sources that is already available to the platform, without relying on hired consultants, thereby eliminating consultation services and reducing costs. By leveraging one or more of metadata associated with each application component available for implementation on the client instance; strategic goals and objectives of the enterprise; data regarding current implementation of applications components on client instance; entitlements of current implementation; historical application component feedback; and the like, contextual recommendations on what applications components to focus on first may be made in order of highest return on lowest investment.

FIG. 1 illustrates a block diagram of an embodiment of a cloud computing infrastructure 100 where one or more embodiments of the present disclosure may operate. Cloud computing infrastructure 100 comprises a client network 102, network 108, and a cloud resources platform/network 110. In one embodiment, the client network 102 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 102 represents an enterprise network that could include or be communicatively coupled to one or more local area networks (LANs), virtual networks, data centers and/or other remote networks (e.g., 108, 110). As shown in FIG. 1, client network 102 may be connected to one or more client devices 104A-E and allow the client devices to communicate with each other and/or with cloud resources platform/network 110. Client devices 104A-E may be computing systems such as desktop computer 104B, tablet computer 204C, mobile phone 104D, laptop computer (shown as wireless) 104E, and/or other types of computing systems generically shown as client device 104A. FIG. 1 also illustrates that client network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between client network 102 and other networks such as network 108 and cloud resources platform/network 110. Local compute resource 106 may also facilitate communication between other external applications, data sources, and services, and client network 102.

FIG. 1 also illustrates that client network 102 may be connected to a computer configured to execute a management, instrumentation, and discovery (MID) server 107. For example, MID server 107 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 100 also includes cellular network 103 for use with mobile communication devices. Mobile cellular networks support mobile phones and many other types of mobile devices such as laptops etc. Mobile devices in cloud computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers (e.g., local compute resource 106). In addition, the mobile devices may interact with other mobile devices or with non-mobile devices such as desktop computer 104B and various types of client device 104A for desired services. Although not specifically illustrated in FIG. 1, client network 102 may also include a dedicated network device (e.g., gateway or router) or a combination of network devices that implement a customer firewall or intrusion protection system.

FIG. 1 illustrates that client network 102 is coupled to a network 108. Network 108 may include one or more computing networks, such as other LANs, wide area networks (WANs), the Internet, and/or other remote networks, in order to transfer data between client devices 104A-E and cloud resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, cloud resources platform/network 110 is illustrated as a remote network (e.g., a cloud network) that is able to communicate with client devices 104A-E via client network 102 and network 108. The cloud resources platform/network 110 acts as a platform that provides additional computing resources to the client devices 104A-E and/or client network 102. For example, by utilizing the cloud resources platform/network 110, users of client devices 104A-E may be able to build and execute applications, such as automated processes for various enterprise, IT, field service and/or other organization-related functions. In one embodiment, the cloud resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form of a multi-computing device (e.g., multiple physical hardware servers). Examples of server instances 114 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 110, network operators may choose to configure data centers 112 using a variety of computing infrastructures. In one embodiment, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple client instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another embodiment, one or more of the data centers 112 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 110, and customer-driven upgrade schedules. An example of implementing a client instance within a multi-instance cloud architecture will be discussed in more detail below when describing FIG. 2.

Figure 2:
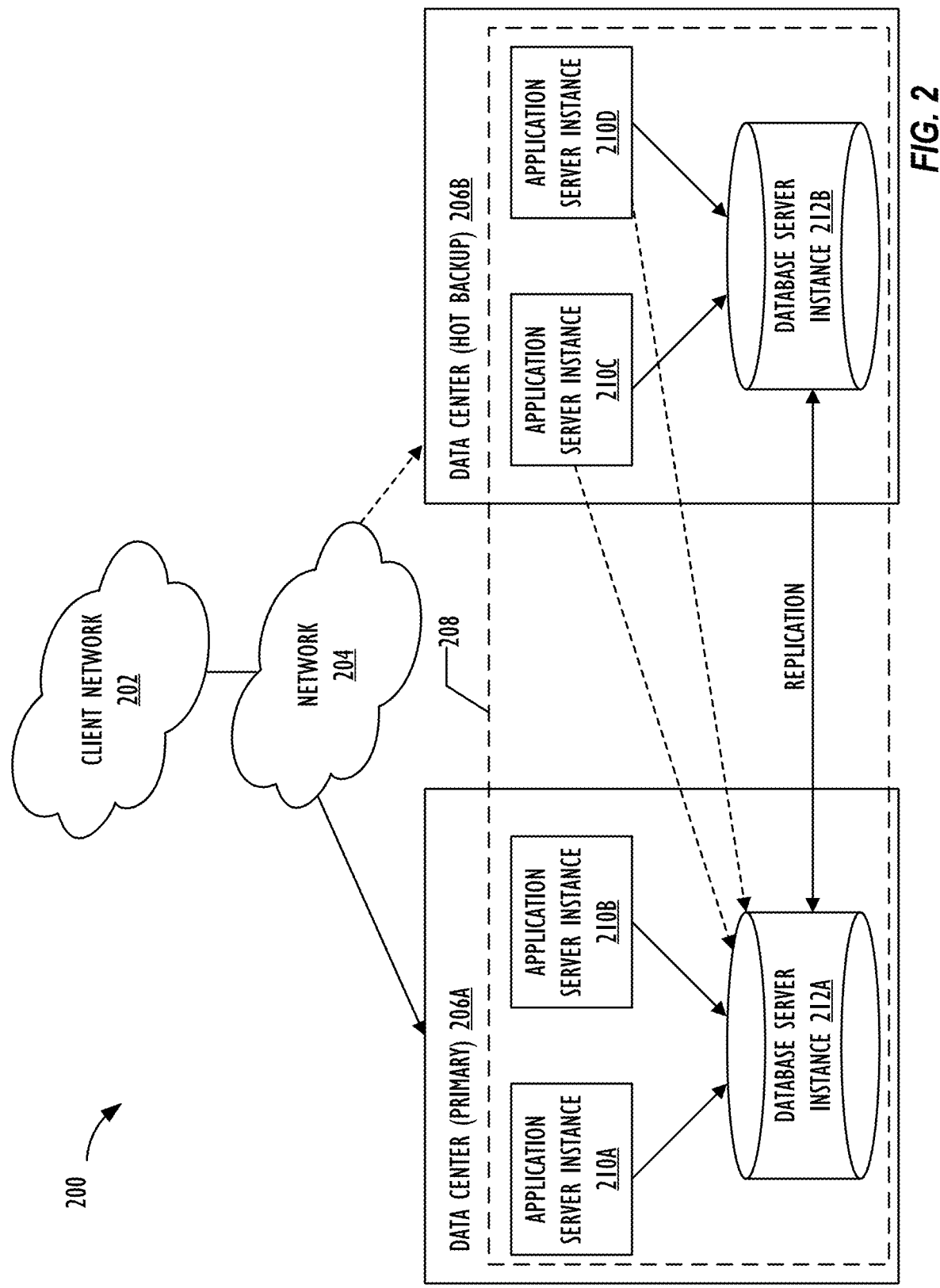
FIG. 2 illustrates a block diagram of multi-instance cloud architecture 200 where one or more embodiments of the present disclosure may operate.

In one embodiment, utilizing a multi-instance cloud architecture, a first client instance may be configured with a client side application interface such as, for example, a web browser executing on a client device (e.g., one of client devices 104A-E of FIG. 1). FIG. 2 illustrates a block diagram of an embodiment of a multi-instance cloud architecture 200 where embodiments of the present disclosure may operate. FIG. 2 illustrates that, the multi-instance cloud architecture 200 includes a client network 202 that connects to two data centers 206A and 206B via network 204. Client network 202 and network 204 may be substantially similar to client network 202 and network 208 as described in FIG. 2, respectively. Data centers 206A and 206B can correspond to FIG. 1's data centers 112 located within cloud resources platform/network 110. Using FIG. 2 as an example, a client instance 208 is composed of four dedicated application server instances 210A-210D and two dedicated database server instances 212A and 212B. Stated another way, the application server instances 210A-210D and database server instances 212A and 212B are not shared with other client instances 208. Other embodiments of multi-instance cloud architecture 200 could include other types of dedicated server instances, such as a web server instance. For example, client instance 208 could include the four dedicated application server instances 210A-210D, two dedicated database server instances 212A and 212B, and four dedicated web server instances (not shown in FIG. 2).

To facilitate higher availability of client instance 208 application server instances 210A-210D and database server instances 212A and 212B are shown to be allocated to two different data centers 206A and 206B, where one of data centers 206 may act as a backup data center. In reference to FIG. 2 data center 206A acts as a primary data center that includes a primary pair of application server instances 210A and 210B and primary database server instance 212A for client instance 208, and data center 206B acts as a secondary data center to back up primary data center 206A for client instance 308. To back up primary data center 206A for client instance 308, secondary data center 306B includes a secondary pair of application server instances 210C and 210D and a secondary database server instance 212B. Primary database server instance 212A is able to replicate data to secondary database server instance 212B. As shown in FIG. 2, primary database server instance 212A replicates data to secondary database server instance 212B using a replication operation such as, for example, a Master-Master MySQL Binlog replication operation. The replication of data between data centers could be implemented in real time or by implementing full backup weekly and daily incremental backups in both data centers 206A and 206B. Having both a primary data center 206A and secondary data center 206B allows data traffic that typically travels to the primary data center 206A for client instance 208 to be diverted to secondary data center 206B during a failure and/or maintenance scenario. Using FIG. 2 as an example, if application server instances 210A and 210B and/or primary data server instance 212A fail and/or are under maintenance, data traffic for client instance 208 can be diverted to secondary application server instances 210C and 210D and secondary database server instance 212B for processing.

Although FIGS. 1 and 2 illustrate specific embodiments of cloud computing system 100 and multi-instance cloud architecture 200, respectively, the disclosure is not limited to the specific embodiments illustrated in FIGS. 1 and 2. For instance, although FIG. 1 illustrates that cloud resources platform/network 110 is implemented using data centers, other embodiments of the cloud resources platform/network 110 are not limited to data centers and can utilize other types of remote network infrastructures. Moreover, other embodiments of the present disclosure may combine one or more different server instances into a single server instance. Using FIG. 2 as an example, application server instances 210 and database server instances 212 can be combined into a single server instance. The use and discussion of FIGS. 1 and 2 are only exemplary to facilitate ease of description and explanation.

Figure 3:
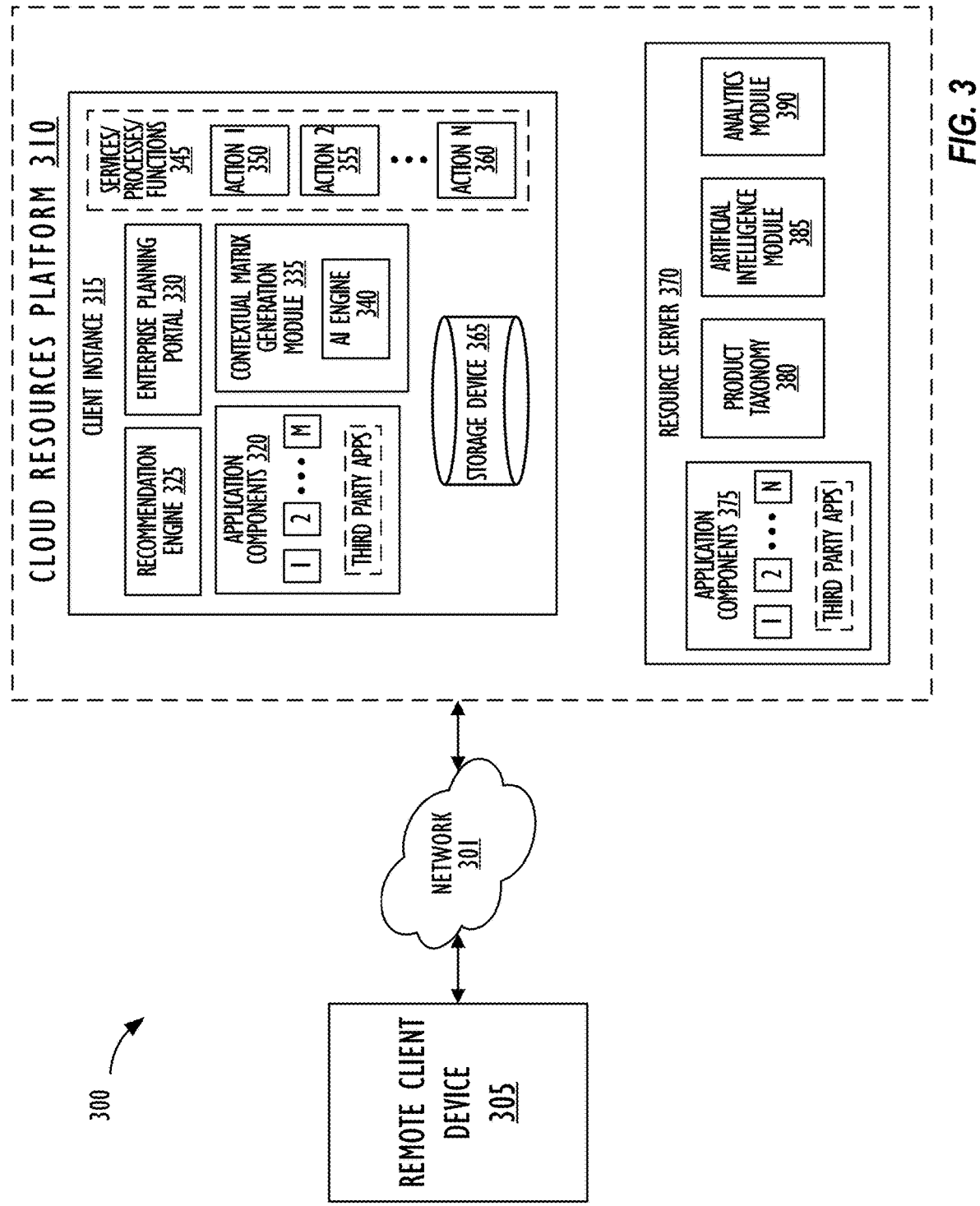
FIG. 3 illustrates a block diagram of platform product recommendation system 300 where one or more embodiments of the present disclosure may operate.

FIG. 3 illustrates a block diagram of platform product recommendation system 300 where one or more embodiments of the present disclosure may operate. As shown in FIG. 3, platform product recommendation system 300 may include remote client device 305 and cloud resources platform 310 that are communicatively coupled to each other through network 301. Remote client device 305 may be substantially similar to any of client devices 104A-E as described in FIG. 1, and network 301 may be substantially similar to any of client network 102 and network 108 as described in FIG. 1. Detailed description of remote client device 305 and network 301 is omitted here. Cloud resources platform 310 may be substantially similar to cloud resources platform/network 110 as described in FIG. 1 and may include client instance 315 and resource server 370. Client instance 315 and resource server 370 may be configured to communicate with each other in any suitable manner. For example, client instance 315 and resource server 370 may communicate via a private local area network or via a public network such as the Internet. Client instance 315 and resource server 370 may be provided on the same or on different data centers and/or server instances (e.g., same or different data centers 112, same or different server instances 114, and the like).

Client instance 315 may be substantially similar to client instance 208 as described in FIG. 2. Client instance 315 may be hosted on cloud resources platform 310 and may be accessible by a user of remote client device 305 via network 301 through an application interface such as, for example, a web browser executing on remote client device 305, in order to access software applications or application components (i.e., platform products, plugins, functionalities, features, and the like) deployed on client instance 315. Client instance 315 may host multiple deployed applications and application components associated with an enterprise that are collectively represented by application components 1, 2, . . . , M 320. Each application component 1, 2, . . . , M 320 may correspond to a feature, plugin, or functionality of one or more applications and may be a part of an out of the box (OOTB) implementation of a suite of application products including multiple application components deployed on client instance 315. Application components 1, 2, . . . , M 320 may also include one or more third party apps (i.e., applications, features, or plugins) that may be obtained from an application store hosted on resource server 370 and that may be deployed on client instance 315 to provide specific capabilities for performing one or more actions (e.g., action 1 350, action 2 355, . . . , action N 360) associated with client instance 315. In one embodiment, one or more of application components 1, 2, . . . , M 320 may be obtained by downloading the component from resource server 370 and activating the component by licensing relevant software products or product suites. Further, application components 1, 2, . . . , M 320 may also include customized components that are custom built on client instance 315 to provide specific functionality in accordance with strategic needs of the enterprise associated with client instance 315.

Each application component 1, 2, . . . , M 320 may provide coverage in one or more capability areas or enterprise units such as IT, security, customer service, HR, finance, legal, marketing, sales, compliance, and governance. For example, application components 1, 2, . . . , M 320 may include components related to the following applications and modules: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions. These exemplary applications or components may be deployed consistent with an industry-standard best-practices structured framework (e.g., ITIL framework, IT4IT™ framework, the Process Classification Framework (PCF)® of the APQC, and the like). Detailed description of these frameworks is omitted here.

Services/processes/functions 345 associated with client instance 315 may represent various services, processes, or functions (i.e., capabilities) of the enterprise that may be provided, managed, accessed, monitored, and the like by users or vendors of the enterprise through client instance 315. Services/processes/functions 345 may include services that users or vendors of the enterprise may actually use (e.g., email service, backup service, HR onboarding) and may need help with from, for example, IT or HR department of the enterprise; processes that may include methods by which the services of the enterprise are delivered to users; and functions that may represent different functions, units, or capability areas of the enterprise like IT, security, customer service, HR, finance, legal, marketing, sales, compliance, and the like. As shown in FIG. 3, services/processes/functions 345, individually or collectively, may be more generally represented as including one or more actions (e.g., action 1 350, action 2 355, . . . , action N 360). The one or more actions (e.g., action 1 350, action 2 355, . . . , action N 360) may be respectively associated with and functionally covered by various application components (e.g., application components 1, 2, . . . , M 320) deployed on client instance 315. As application components 1, 2, . . . , M 320 change (i.e., components added, updated, deleted, and the like), services/processes/functions 345 of the enterprise may change (i.e., optimize) as well.

Each application component 1, 2, . . . , M 320 may have a different level of maturity (maturity score) depending on the level of implementation of the component. That is, even if an application component is deployed on client instance 315 (i.e., the user of client instance 315 is entitled to utilize the component for providing a capability (e.g., action 1 350, action 2 355, . . . , action N 360)), the component may not have been adequately implemented for effective use on client instance 315. Whether or not the component has been adequately implemented may be determined based on a variety of criteria such as whether or not the component (e.g., feature or plugin) has been 'enabled' (activated) or turned 'ON' in client instance 315; version number of the component; entitlement to install and use related one or more application components; update cycles; number of installations; time since initial release; frequency of use; time of last use; amount of created and added user data (e.g., number of rows in a one or more tables); log file entries; and the like. In one embodiment, recommendation engine 325 may determine a maturity score (e.g., a value between 1 and 10, with 10 indicating a highest level of maturity) indicating a level of maturity of implementation of each application component 1, 2, . . . , M 320, update the maturity score depending on changes made to the application component, and store a current maturity score of each component in storage device 365. As explained in more detail later, the maturity scores may be used in making ranked platform product recommendations by recommendation engine 325. Storage device 365 of client instance 315 may be a relational database storing proprietary data, application component 1, 2, . . . , M 320 data, enterprise planning portal 330 data, and contextual matrix generation module 335 data, and the like associated with client instance 315.

Enterprise planning portal 330 may enable users of client instance 315 to implement an enterprise plan to facilitate the enterprise in achieving its high-level goals and objectives and drive investment decisions regarding which capability areas or enterprise units to invest in. Enterprise planning may involve various entities of the enterprise such as goals, target scores, enterprise units, capabilities, enterprise strategies, and enterprise unit strategies (i.e., metrics). A user (e.g., enterprise planner) of client instance 315 may utilize enterprise planning portal 330 to centrally manage these metrics to enable the enterprise to plan, track, and achieve its strategic objectives and goals in an organized and efficient manner. The user may set and track, on enterprise planning portal 330, a variety of monitored metrics (e.g., enterprise strategies; enterprise unit strategies; goals; objectives; targets such as target risk score, target cost score, and target agility score; capabilities or processes identified in a standardized framework; and the like) to optimize one or more actions (services/processes/functions 345) associated with the enterprise. Thus, the monitored metrics may help identify which areas (e.g., enterprise unit, capability area, standardized framework capability, and the like) to invest and mature capabilities or add new capabilities in, thereby more fully leveraging client instance 315 in transforming operations of the enterprise.

In one embodiment, the user may utilize enterprise planning portal 330 to set a metric that is directed toward one or more factors such as reducing risk, reducing cost, and improving agility of the enterprise. The metric may be set by the user by specifying one or more target scores or values (e.g., a value between 1 and 10, with 10 indicating highest priority) for the one or more factors. Alternately, the scores may be automatically set by enterprise planning portal 330 based on semantic data of the metric specified by the user or selected from a list of metrics by the user. Enterprise planning portal 330 may rely on artificial intelligence based models to set the scores for the factors based on the semantic data of the metric. The specified scores may represent a combination of values for each of the factors like reducing risk, reducing cost, and improving agility, with each score in the combination representing a current target priority of achieving improvement corresponding to the respective factor area.

In addition, or in the alternative, the optimization or monitored metric may be specified by the user by selecting a capability listed in an industry-standard best-practices structured framework (e.g., ITIL framework, IT4IT™ framework, the Process Classification Framework (PCF)® of the APQC, and the like). Still further, or in the alternative, the monitored metric may be semantically specified by the user by creating a new record in a table (e.g., enterprise strategy table, enterprise unit strategy table, goals table, and the like) associated with enterprise planning portal 330. Other means to set the metric are also plausible so long as the objectives or goals of the enterprise are conveyed to client instance 315. For example, one or more metrics may be automatically set in portal 330 based on predetermined triggers such as a key performance indicator (KPI) satisfying a predetermined threshold, or another monitored indicator or breakdown breaching one or more a predetermined benchmark values.

Figure 4:
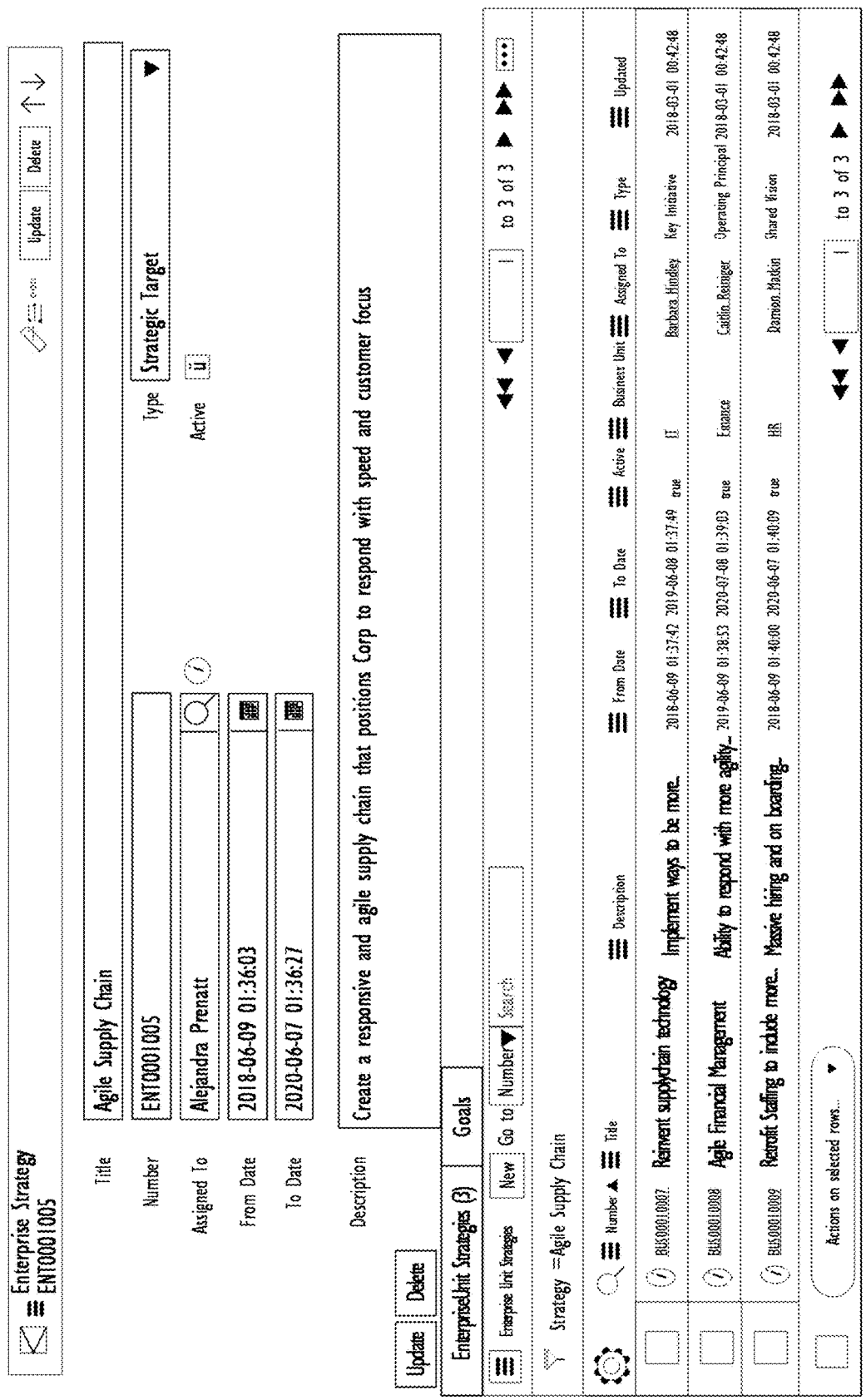
Figure 5:
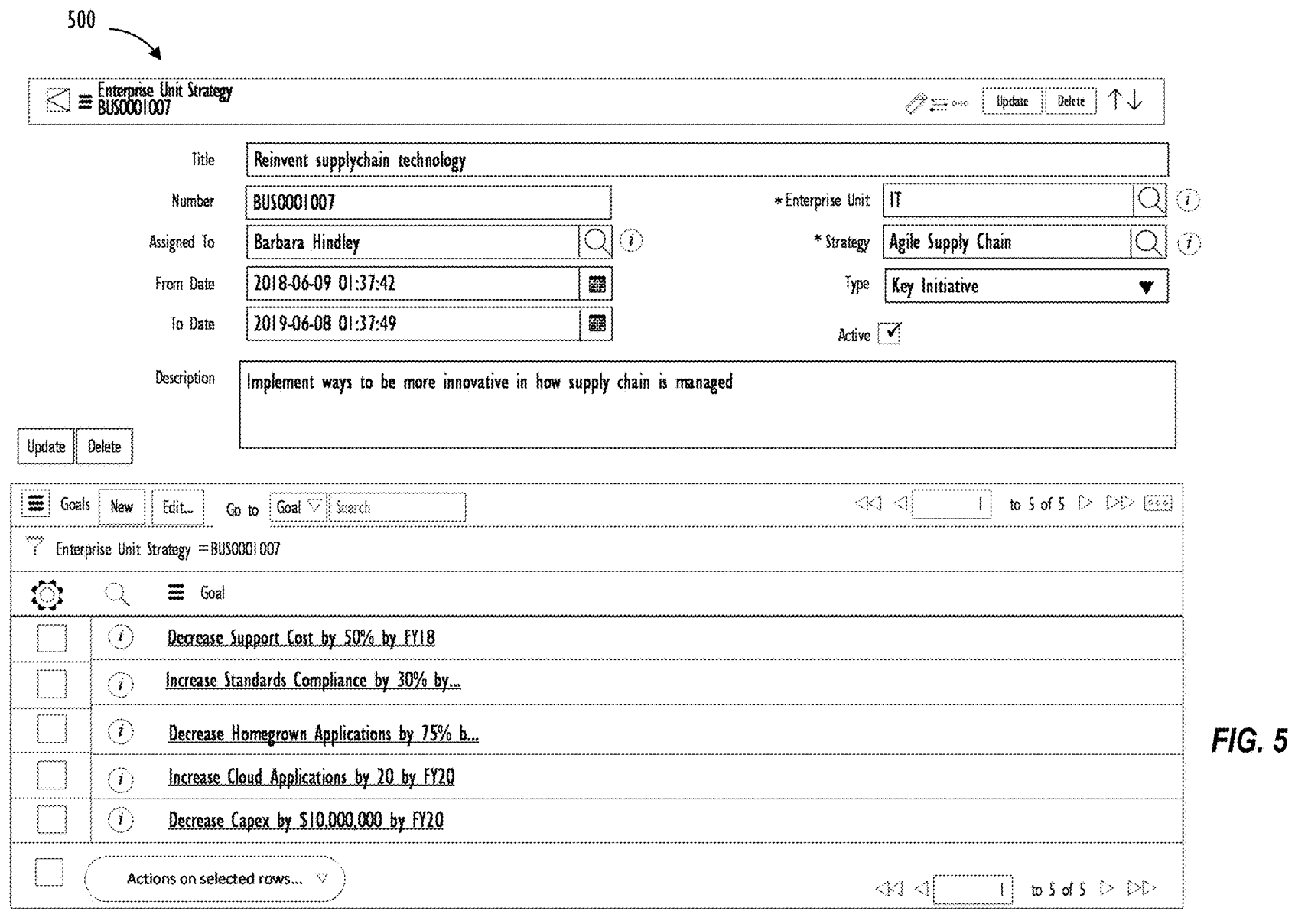

An embodiment in which the metric may be semantically specified by the user by creating a new record in a table is described in further detail in connection with the screen shots shows in FIGS. 4 and 5. FIG. 4 shows a screen shot of GUI 400 of enterprise planning portal 330 illustrating a record form for creating an enterprise strategy metric and associating enterprise unit strategy metrics with the enterprise strategy metric in accordance with one or more disclosed embodiments. Further, FIG. 5 shows a screen shot of GUI 500 illustrating a record form for creating an enterprise unit strategy metric and associating enterprise goal metrics with the enterprise unit strategy metric in accordance with one or more disclosed embodiments.

As shown in GUI 400, a user may set an enterprise strategy (e.g., "Agile Supply Chain") as a monitored metric by creating and storing a record in an Enterprise Strategy table. The user may set a variety of attributes associated with the metric such as duration; strategy type; description; name of the user responsible for managing the strategy, executing the strategy; and the like. Further, as shown in GUI 500, a user may set an enterprise unit strategy (e.g., "Reinvent supply chain technology") as a monitored metric by creating and storing a record in an Enterprise Unit Strategy table. As shown in GUI 500, the enterprise unit strategy may include additional attributes associated with the metric such as duration; description; name of user the metric is assigned to; enterprise unit of the metric; associated enterprise strategy; strategy type; and the like. As shown in GUIs 400 and 500, the user may associate one or more enterprise unit strategies (e.g., "Reinvent supply chain technology", "Agile financial management", and the like) to an enterprise strategy (e.g., "Agile Supply Chain"), and further as shown in GUI 500, the user may also associate one or more goals (e.g., "Decrease Support Cost by 50% by FY18", "Increase Standards Compliance by 30%", and the like) to each enterprise unit strategy, thereby setting measurable and monitored targets, strategies and goals for achieving the high-level objectives of the enterprise via enterprise planning portal 330. In one embodiment, each enterprise strategy, enterprise unit strategy, and goal that is created and set in enterprise planning portal 330 may act as a monitored metric based on which recommendation engine 325 may make platform product recommendations.

Figure 6:
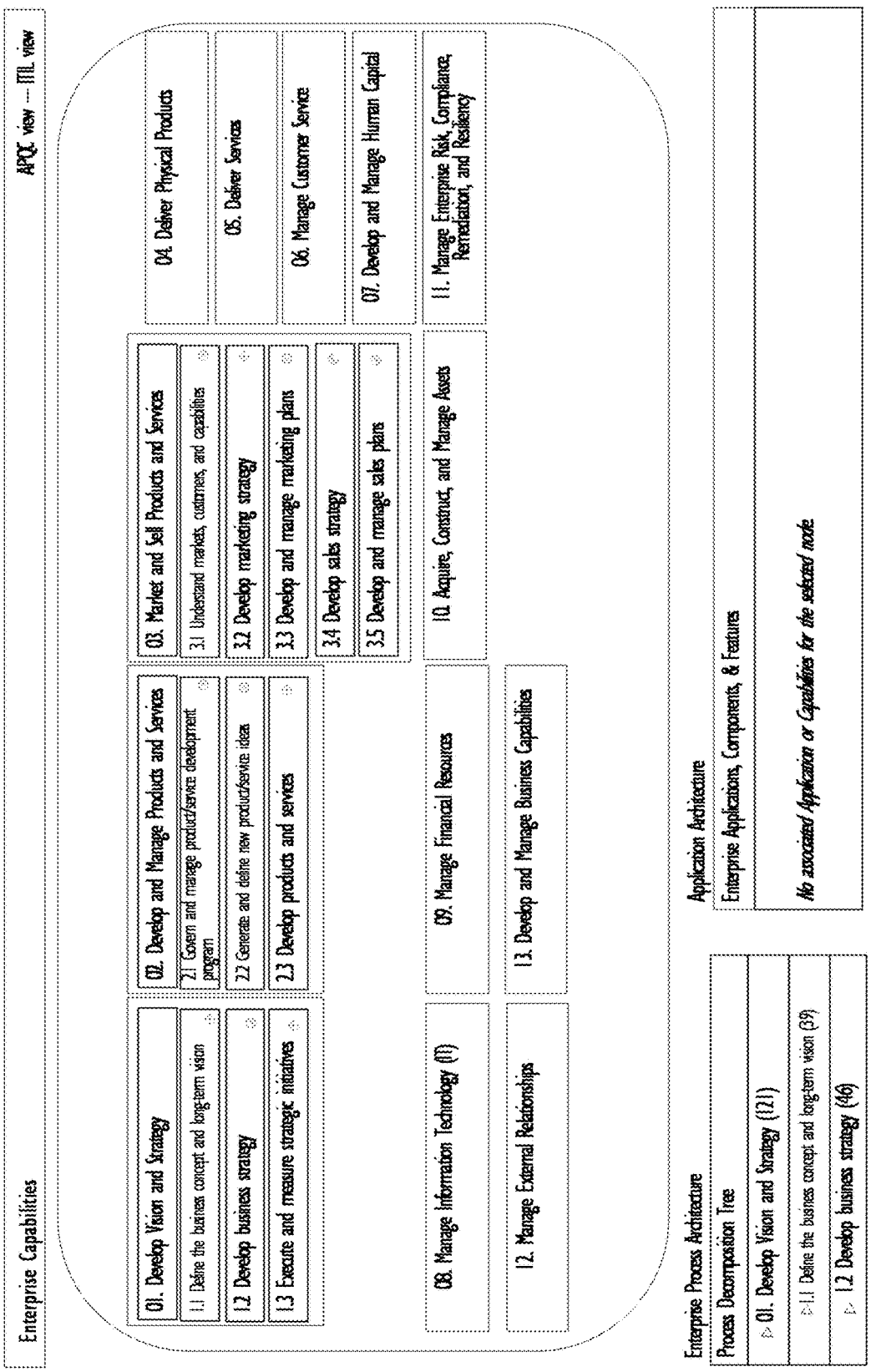
FIG. 6 shows an illustrative screen shot of GUI 600 for selecting standardized capabilities of a structured framework to identify a metric in accordance with one or more disclosed embodiments.

An embodiment in which the metric may be specified by the user by selecting a capability listed in an industry-standard best-practices structured framework is described in further detail based on the disclosure in FIG. 6. FIG. 6 shows an illustrative screen shot of GUI 600 for selecting one or more standardized capabilities listed in a structured framework in accordance with one or more disclosed embodiments. As shown in GUI 600, a user may identify or set a metric by selecting one or more standardized capabilities that are hierarchically identified in a structured framework (e.g., ITIL framework, IT4IT™ framework, the Process Classification Framework (PCF)® of the APQC, and the like). The structured framework may represent a taxonomy of cross-functional enterprise processes that are intended to allow objective comparison of enterprise performance within and among enterprises. The framework may be an open standard to facilitate improvement through process management and benchmarking. The exemplary embodiment illustrated in GUI 600 of FIG. 6 enables the user to set the metric by selecting one or more capabilities or processes listed in the APQC PCF framework. Use of the APQC PCF framework as shown in GUI 600 is illustrative only and not intended to be limiting. The ITIL framework, IT4IT framework, or any other industry-standard best-practices structured framework may be used instead.

As shown in GUI 600, the PCF framework includes 13 enterprise-level categories (e.g., "01. Develop Vision and Strategy", "02. Develop and Manage Products and Services", and the like), each category including associated process groups (e.g., "2.1. Govern and manage product/service development program", "3.1. Understand markets, customers, and capabilities", and the like). Each process group further includes processes, activities, and tasks that are organized in a hierarchical manner. The user may set the metric simply by identifying (or selecting) one or more of any category, process group, process, activity, or task of the framework. Recommendation engine 325 may then make platform product recommendations based on the identified or selected category, process group, process, activity, or task of the framework. In one embodiment, the standardized capability of the framework may be automatically identified and associated with a set metric based on semantic matching or other textual matching technique with an unstructured textual monitored metric (e.g. enterprise strategy or enterprise unit strategy of GUI 400 and 500) input by a user.

Recommendation engine 325 makes ranked platform product (i.e., application component) recommendations. To contextualize the recommendations, recommendation engine 325 may rely on data from multiple sources including the metrics set in the enterprise planning portal 330, metadata of currently installed and implemented application components 1, 2, . . . , M 320, data from resource server 370, and contextual data generated by contextual matrix generation module 335.

Resource server 370 acts as a shared resource including data and application components available for multiple client instances 315 on cloud resources platform 310. Resource server 370 may include application components 1, 2, . . . , N 375, product taxonomy 380, artificial intelligence module 385, and analytics module 390. Application components 1, 2, . . . , N 375 may correspond to a master repository of all application components of all applications that are available for deployment and use on client instance 315. For example, multiple tiers of a software product suite may be available for licensing on resource server 370, with a higher-level tier including additional applications and application components that are not available in a lower-level tier. Depending on the 'tier-level' the enterprise associated with client instance 315 is licensed to, application components 1, 2, . . . , M 320 of client instance 315 may include some or all of the components available in application components 1, 2, . . . , N 375 of resource server 370. Application components 1, 2, . . . , N 375 may also include one or more third party apps (i.e., applications, features, or plugins) that are available for download by client instance 315 upon purchase of the license from an application store hosted on resource server 370 or at another remote location. The third party apps may be developed by third party developers and may include product descriptions and value propositions detailing specific new functionality or supplementing of existing functionality provided by the third party app. The application store may act as an aggregator of all third party applications that are available for download and licensing by individual client instances 315.

Product taxonomy 380 is a model that may include, for each application component 1, 2, . . . , N 375 of resource server 370, a variety of metadata (attributes or criteria) that describes in a consistent way what the component is, what the component does, and its value proposition. Product taxonomy 380 may provide in a standardized "language": (i) a common vocabulary with which different users and enterprises may communicate effectively about applications and application components on the platform and issues related to the application components; (ii) a common set of attributes that support industry techniques for analyzing issues and problem data; (iii) a uniform approach for classification of content, regardless of source or where content is encountered within project, product, or system life cycle; and (iv) classification data for a variety of purposes including defect causal analysis, project management, product recommendation, and software process improvement. Product taxonomy 380 may be further intended to implement foundational tools, applications, and roadmaps for discovery of information; improve findability with search, resulting in improved user satisfaction; and improve relevancy of content and content effectiveness to drive productivity and insights for decision making.

For each entity in a hierarchy of application families, applications, and application components, product taxonomy 380 may include one or more metadata tags that include: semantic data indicating a description of the entity and description of the value provided by the entity (value proposition); entity class; enterprise capability area; enterprise unit; preferred label; alternative labels; related entities including broader entities and narrower entities; data dependency indicating operational dependency of the entity on availability of predetermined data; parent and child dependency data indicating a parent and/or child operational dependency of the entity; and the like. The parent operational dependency data of a particular entity may indicate (identify) other entities that are activated by the particular entity. Conversely, the child operational dependency data of the particular entity may identify other entities that activate the particular entity. For example, a "Customer Service Management" application metadata may list multiple application components (e.g., "Assessment", "Asset Management", "Assignment Workbench", and the like) as components that are activated by (or are operationally dependent on) the "Customer Service Management" application. Conversely, the "Assessment" application component metadata may list multiple applications or components (e.g., "Customer Service Management"; "Demand Management"; "Governance, Risk, and Compliance"; and the like) as entities that activate the "Assessment" application component (thus indicating that the "Assessment" application component is operationally dependent on implementation (or activation) of at least one of "Customer Service Management"; "Demand Management"; or "Governance, Risk, and Compliance" applications).

The metadata included in product taxonomy 380 for each application component 1, 2, N 375 of resource server 370 may also include, for each entity: one or more scores (e.g., a value between 1 and 10) for one or more factors like reduces risk, reduces cost, and improves agility; feedback data indicating an effectiveness score of the entity based on historic customer implementation of the entity; version information indicating a version number and release notes associated with the entity; and one or more identifiers identifying standardized capabilities or processes listed in one or more standardized frameworks (e.g., APQC PCF, ITIL, IT4IT, and the like). This standardized framework capability metadata associated with each application component 1, 2, . . . , N 375 may be modeled based on a mapping between standardized framework capabilities (criteria) and respective applications and application components 1, 2, . . . , N 375 of resource server 370 (or third party applications), as shown in FIG. 7.

FIG. 7 illustrates artifact 700 showing exemplary mapping data that maps standardized capabilities of a structured framework to respective applications, application components and third party applications, in accordance with one or more disclosed embodiments. As shown in example artifact 700, exemplary standardized capabilities 710 listed in the IT4IT framework are mapped with corresponding applications 720, application components 730, and third party applications 740 (if any). By modelling this mapping data, metadata associated with each application component 1, 2, . . . , N 375 may be created and included in product taxonomy 380. Mapping based on the IT4IT framework as shown in artifact 700 is illustrative only and not intended to be limiting. The ITIL framework, APQC PCF framework, or any other industry-standard best-practices structured framework may be mapped to application components 1, 2, . . . , N 375 as well or in its stead.

In one embodiment, the metadata included in product taxonomy 380 for each application component 1, 2, . . . , N 375 of resource server 370 may be manually created and stored. For example, the metadata may be created, maintained, and updated over time by relevant stakeholders (e.g., administrators, analysts, project managers, application developers, users) using enterprise value assessments as application components 1, 2, . . . , N 375 are released or updated and made available on resource server 370 for deployment on one or more client instances 315. For third party apps, the metadata may be obtained based on the product description and value proposition of the application listed in the application store. Alternately, one or more of the metadata tags associated with each application component 1, 2, . . . , N 375 may be automatically generated or updated by semantically understanding the value proposition or description of the application component either in unstructured text or in a structured way using key performance indicators and benchmarks, and leveraging semantic matching or artificial intelligence (e.g., machine learning, deep learning, neural net) techniques. For example, artificial intelligence module 385 including a machine learning model developed based on a known dataset may be used to automatically classify, using semantic matching or another similar technique, applications and application components 1, 2, . . . , N 375 into classes corresponding to respective standardized framework capabilities and processes provided by the component, and to a predict functional coverage score provided by the component to cover the corresponding predicted standardized capability. Alternately, the machine learning model may classify the applications and application components 1, 2, . . . , N 375 based on other attributes such as: a classification based on predetermined factors (e.g., whether the entity is risk-focused, cost-focused, or agility-focused); a classification based on enterprise capability or unit area (e.g., whether the entity is for mainly IT, HR, Finance, Legal, Sales, or the like); a classification based on a predetermined list of metrics; and the like. The machine learning model may further be trained to assign, to each application component 1, 2, . . . , N 375, a score indicating a quality of functional coverage the component provides in achieving a predetermined factor (e.g., reduce risk, reduce cost, increase agility). Based on the classification and predicted accuracy of the machine learning model, AI module 385 may automatically create and set metadata tags in product taxonomy 380 at different granularity levels (e.g., for each application; application component 1, 2, . . . , N 375; and the like). Utilizing AI module 385 provides a scalable solution for automatically generating metadata in product taxonomy 380 based on changes made to application components 1, 2, . . . , N 375 (e.g., insert, update, delete, and the like).

Analytics module 390 may further provide additional metadata for each entity in product taxonomy 380. For example, analytics module 390 may provide, for each application component 1, 2, . . . , N 375, metadata including: implementation time and cost data relating to the amount of time and cost it takes to implement the application component; feedback data indicating an effectiveness score of the application component in achieving its stated value proposition. The feedback data may be gathered by analytics module 390 from multiple client instances 315 querying respective users (via, e.g., survey and assessments application, customer reviews, and the like) on an efficacy of respective application components 1, 2, . . . , M 320 based on attributes like value realization, time and cost to implement the application component, and the like. Feedback data thus gathered based on historic client instance implementations may be converted into an effectiveness score (i.e., rating) that is modeled to respective application components 1, 2, . . . , N 375 and stored as part of product taxonomy 380 data on resource server 370.

Based on one or more metrics set in enterprise planning portal 330 (or based on the high-level objectives and goals of the enterprise), and further based on metadata included in product taxonomy 380, recommendation engine 325 may detect, as platform product recommendations, one or more application components from among application components 1, 2, . . . , N 375 (including third party apps) available on resource server 370. Recommendation engine 325 may detect the one or more application components based on semantic matching between data associated with the metric and the metadata of application components 1, 2, . . . , N 375 included in product taxonomy 380. Alternately, or in addition, recommendation engine 325 may detect the one or more application components based on: a target score of a factor (e.g., risk, cost, agility) set in a metric and the corresponding factor score indicated to be provided by the metadata of the respective application component 1, 2, . . . , N 375; a capability area or unit area indicated by the metric and the corresponding capability area or unit area indicated by the metadata of the respective application component 1, 2, ..., N 375; a standardized capability or process of a structured framework indicated by the metric and one or more application components 1, 2, ..., N 375 indicated to be corresponding to the standardized capability by the metadata in product taxonomy 380; effectiveness score data of one or more application components 1, 2, ..., N 375; and the like.

The granularity of the detection by recommendation engine 325 may depend on the quality and amount of data available for making the recommendation. For example, if semantic data or other contextual data (e.g., factor target score, standardized capability identifier, and the like) associated with a set metric is available, one or more application components detected as providing functional coverage for the identified metric may be more granular and specific (e.g., feature or functionality specific).

Figure 8:
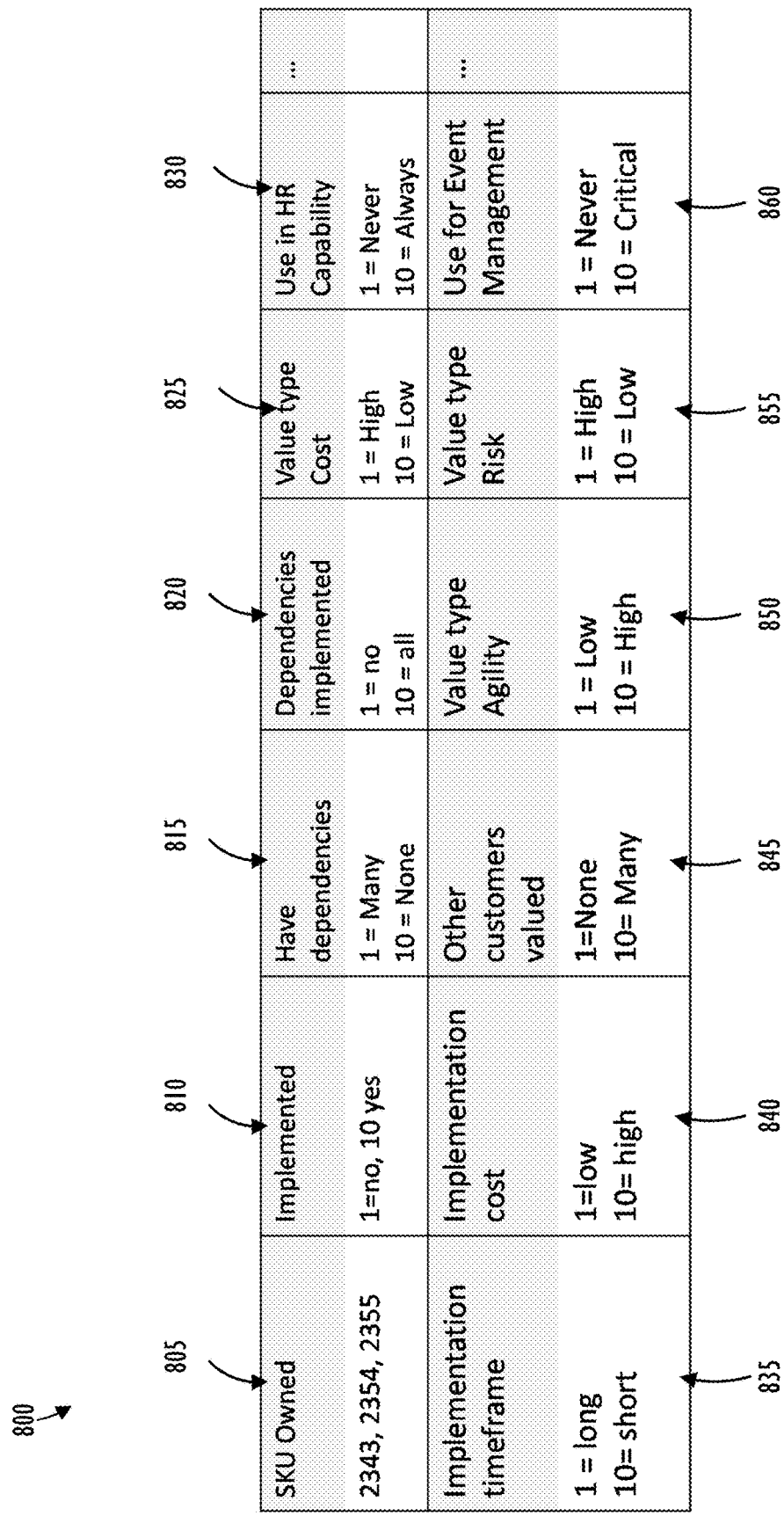
FIG. 8 illustrates matrix 800 showing exemplary criteria associated with an application component in accordance with one or more disclosed embodiments.

Contextual matrix generation module 335 may generate, for each application component from among detected application components detected by recommendation engine 325, a contextual matrix including criteria or attributes of the component in context of the current implementation (i.e., application components 1, 2, ..., M 320) of client instance 315. In one embodiment, contextual matrix generation module 335 may generate the contextual matrices only for the detected components detected by recommendation engine 325. Alternately, contextual matrix generation module 335 may generate the contextual matrix for all application components 1, 2, ..., N 375 available on resource server 370. A sample contextual matrix generated by contextual matrix generation module 335 is shown in FIG. 8. Matrix 800 in FIG. 8 shows exemplary criteria or attributes (metadata tags) describing exemplary metadata of a detected application component in accordance with one or more disclosed embodiments.

As explained above, in product taxonomy 380, every application component 1, 2, ..., N 375 may have a multitude of metadata tags (i.e., criteria or attributes). For each application component 1, 2, ..., N 375, contextual matrix generation module 335 may fetch one or more of these metadata tags from product taxonomy 380 and perform contextual processing on the metadata based on a current implementation (i.e., currently deployed application components 1, 2, ..., M 320) on client instance 315 to create a contextual matrix of criteria that may be used in scoring and ranking application components 1, 2, ..., N 375 detected by recommendation engine 325. The contextual matrix enables recommendation engine 325 to consider the corresponding application component from many different dimensions for determining appropriate ranking of the component relative to other detected application components for providing functional coverage to the set monitored metric to optimize to one or more actions (services/processes/functions 345) with lowest investment and highest return. With the strength of each individual score captured in each matrix cell, and with the contextual data regarding the current implementation on client instance 315, recommendation engine 325 may score and rank all detected application components out of components 1, 2, ..., N 375 based on the scores across multiple dimensions in context of the current implementation installed and deployed on client instance 315.

As shown in FIG. 8, matrix 800 may include multiple cells representing criteria including "SKUs Owned" cell 805, "Implemented" cell 810, "Have Dependencies" cell 815, "Dependencies Implemented" cell 820, "Value type cost" cell 825, "Use in HR capability" cell 830, "Implementation timeframe" cell 835, "Implementation Cost" cell 840, "Other customers valued" cell 845, "Value type agility" cell 850, "Value type risk" cell 855, "Use for event management" cell 860, and the like. The type and number of cells are not limited in any way and any suitable metadata may be part of matrix 800 based on which recommendation engine 325 may rank one or more application components 1, 2, ..., N 375. "SKUs Owned" cell 805 may include information to identify applications and application components 1, 2, ..., M 320 currently installed and deployed on client instance 515. "Implemented" cell 810 may indicate a maturity score of implementation of the current application component on client instance 315. For example, if the application component corresponding to matrix 800 is installed and deployed on client instance 315 but the application component has not been sufficiently implemented (or activated), contextual matrix generation module 335 may indicate a lower score (e.g., 1) in the "Implemented" cell 810. Conversely, if the maturity of deployment of the application component is high, contextual matrix generation module 335 may indicate a higher score (e.g., 10) in the "Implemented" cell 810. Other scores between the high and low scores (e.g., 5) may also be set based on the maturity level of implementation of the component as determined by contextual matrix generation module 335 (based on a variety of criteria such as whether or not the component (e.g., feature or plugin) has been 'enabled' (activated) or turned 'ON' in client instance 315; version number of the component; entitlement to install and use related one or more application components; update cycles; number of installations; time since initial release; frequency of use; time of last use; amount of created and added user data (e.g., number of rows in a one or more tables); log file entries; and the like).

"Have Dependencies" cell 815 may indicate whether or not the application component corresponding to matrix 800 has operational or data dependencies on one or more other application components. Information for "Have Dependencies" cell 815 may be obtained by contextual matrix generation module 335 based on metadata from product taxonomy 380. In one embodiment, the score in "Have Dependencies" cell 815 (e.g., between 1 and 10) may be set by contextual matrix generation module 335 depending the number of component or data dependencies the component has.

"Dependencies Implemented" cell 820 may indicate, for the current application component, the number of operational dependencies (component or data) out of the dependencies identified in "Have Dependencies" cell 815, that have already been implemented on client instance 315. For example, if all of the dependencies identified in "Have Dependencies" cell 815 have already been deployed or implemented (i.e., entitled to component, or maturity score meets threshold), contextual matrix generation module 335 may set a higher value (e.g., 10) in "Dependencies Implemented" cell 820. Conversely, if not all of the dependencies identified in "Have Dependencies" cell 815 have been deployed or implemented, contextual matrix generation module 335 may set a lower score (e.g., 1).

Each of "Value type cost" cell 825, "Value type agility" cell 850, and "Value type risk" cell 855, in matrix 800 may indicate a score attributed to the application component for providing functional coverage or improvement in the corresponding factor or criteria. Each of "Value type cost" cell 825, "Value type agility" cell 850, and "Value type risk" cell 855, may be set in matrix 800 based on respective scores obtained from the metadata in product taxonomy 380. For example, a high score (e.g., 10) for "Value type agility" cell 850 may indicate that implementation of the current application component may increase agility of the enterprise. As another example, a high score (e.g., 10) for "Value type risk" cell 855 may indicate that implementation of the current application component may reduce risk of the enterprise.

"Use in HR capability" cell 830, and "Use for event management" cell 860 may indicate that the application component provides functional coverage in a corresponding capability area or unit area. For example, a high score (e.g., 10) in "Use for event management" cell 860 may indicate that implantation and use of the current application component may be critical for the event management capability area of client instance 315. A lower score (e.g., 5) in "Use for event management" cell 860 may indicate that the current application component may provide partial functional coverage for the event management capability area of client instance 315.

"Implementation timeframe" cell 835 may indicate the amount of time it takes to implement the current application component, "Implementation Cost" cell 840 may indicate the costs associated with implementing the component, and "Other customers valued" cell 845 may indicate an effectiveness score based on feedback data received for the current application component in providing functional coverage for its stated value proposition. Although the cells in matrix 800 are indicated as storing numeric data, they are not so limited. Any type of data may be stored so long as the matrix cells characterize the relative ranking of multiple application components based on a comparison of the respective criteria. For example, an additional cell may include a score based on risk assessment data indicating the potential for misuse of the corresponding application component by over-customizing the component rather than using OOTB. Also, data for not all of cells 805-860 may be available for every component 1, 2, . . . , N 375. Contextual matrix generation module 335 may create the 'best' matrix 800 possible for each component based on the metadata available in product taxonomy 380. With the matrix approach, the number of cells (i.e., criteria) used by recommendation engine 325 in determining an overall score to rank the application component may be expanded or contracted depending on available metadata and the current implementation of client instance 315, thereby eliminating the drawbacks of conventional approaches involving hard-coded algorithms which are fixed in terms of inputs and outputs. In one embodiment, contextual matrix generation module 335 may set values or information for one or more cells in matrix 800 by obtaining metadata from product taxonomy 380. Alternately, or in addition, contextual matrix generation module 335 may predict values or information for one or more cells in matrix 800 using artificial intelligence (e.g., machine learning, deep learning, neural net, and the like) techniques. For example, contextual matrix generation module 335 may include AI engine 340 that implements a machine learning model to set scores for one or more of cells 805-860 based on machine learning based semantic matching and value proposition based prediction for the application component based on metadata available for the component in product taxonomy 380.

Recommendation engine 325 may generate a ranked list of application components from among application components 1, 2, . . . , N 375 that have been detected based on goals, objectives, or set metrics of the enterprise associated with client instance 315. The ranked list may be contextual to the current implementation of application components 1, 2, . . . , M 320, and metrics of client instance 315. Thus ranked list may change depending on changes to the current implementation of application components 1, 2, . . . , M 320, and metrics of client instance 315.

Recommendation engine 325 may rank detected application components 1, 2, . . . , N 375 based on the respective contextual matrices of scored criteria generated in context of the current implantation on client instance 315. For ranking detected application components 1, 2, . . . , N 375 based on goals, objectives or metrics of the enterprise, recommendation engine 325 may rank application components that provide highest return for lowest investment higher as than application components that don't offer such advantages. That is, recommendation engine 325 may include logic to ensure that predetermined use cases translate to a predetermined ranking in the ranked list of detected application components, and priority scenarios are enforced to appropriately drive investment strategy. For example, in one use case, if client instance 315 is already entitled to a particular detected application component (i.e., the detected application component is part of application components 1, 2, . . . , M 320) but the application component has not been implemented or activated (e.g., maturity score is low), recommendation engine 325 may highly rank the particular detected application component because client instance 315 has already licensed the component (and therefore, entitled to use it) and only needs to implement or activate the component. In another use case, a detected application component may be ranked higher if the detected application component is a newly released version with additional functionality and if client instance 315 is already entitled to (and/or implemented or activated) a previous (e.g., older) version the detected application component. In another use case, a detected application component may be ranked higher if the operational dependency (e.g., data corresponding to "Dependencies Implemented" cell 820, and "Have Dependencies" cell 815 in matrix 800 of FIG. 8, or data dependency) of the component indicates that the component does not have other component or data dependencies that have also not been implemented or client instance 315 is entitled to or made available. Thus, since implementing the component does not require implementing (or investing resources in) additional components client instance 315 is not currently entitled to, recommendation engine 325 may highly rank the application component as a component that can be implemented faster and with less investment of resources than another component which has unfulfilled operational or data dependencies. In a further use case, if the contextual matrix of a detected application component indicates that the application is already implemented and deployed at client instance (e.g., maturity score is high), recommendation engine 325 may de-prioritize (i.e., assign a low rank) or remove the application component from the ranked recommended order of components.

In a still further use case, recommendation engine 325 may set a predetermined order in which the cells of the matrix are relied upon in determining the ranking. Thus, for example, "Implemented" cell 810 may be given the highest priority and if a detected application component is determined to have a low maturity score in "Implemented" cell 810, it may receive the highest ranking because implementing this component may provide the highest return for the lowest investment to the enterprise. In yet another use case, recommendation engine 325 may rank the detected application components based on heuristics or recommended practices of implementing a particular application component before another. In yet another use case, recommendation engine 325 may de-prioritize (i.e., assign lower rank) a component based on a low risk assessment score in the matrix indicating potential for misuse of the application component by over-customizing the component rather than using OOTB.

For each application component in the ranked list of recommendations, recommendation engine 325 may also indicate the reasoning being the ranking by showing corresponding one or more matrix scores which caused the component to have the corresponding rank. Recommendation engine 325 may also rank one or more application components, on which a detected application component has an operational dependency, based on respective contextual matrices of the one or more application components.

In one embodiment, recommendation engine 325 may rank components based on content-based filtering and/or collaborative filtering. In content-based filtering, one or more criteria included in the contextual matrix of the application component may be compared with target criteria determined based on the set monitored metric, and a ranked order may be determined based on the number of criteria cells that match (or fall within a predetermined threshold) between a given application component and the target criteria cells of the monitored metric. In collaborative filtering, the ranking may be based on feedback from other client instances 315 on respective application components.

As feedback associated with an application component improves, the improved feedback score (effectiveness score) captured in the matrix associated with the component may cause the component to score higher and rank higher on the ranked list generated by recommendation engine 325. This creates a "closed loop" system where as an application component improves, feedback for the component may improve, and as a result, the component will appear higher up on the ranked list of components.

In one embodiment, recommendation engine 325 may also identify additional monitored metrics to optimize one or more additional actions based on selection of a highly ranked application component for implementation or deployment on client instance 315. Metadata corresponding to the application component may indicate standardized capabilities or processes in a standardized framework that correspond to the implemented application component, and the standardized capabilities may be relied upon to create additional metrics thereby enabling the enterprise to identify additional areas of improvement.

Based on the contextual matrices for each detected application component, recommendation engine 325 may determine an overall score for each detected application component for use in ranking the components in order of implementation priority. In one embodiment, recommendation engine 325 may utilize Bayesian analysis to determine the scores. Thus, even if information on one or more matrix cells is not available for one or more detected application components, recommendation engine 325 may be able to ignore empty cells and rely on other cells for which information is available to make the corresponding component score higher.

It will be appreciated that the quality of ranking of the application components by recommendation engine 325 is based on the quality of the matrices generated by contextual matrix generation module 335. Thus, if more information is available in a matrix of a detected application component, the accuracy of determination of value (and corresponding rank) provided by the component in context of the goals, objectives, or monitored metrics, and the current implementation of client instance 315 will be high, and vice-versa. Thus, if the identified or set metric is to reduce risk of the enterprise, recommendation engine 325 may assign the same rank to multiple application components from multiple capability areas having metadata indicating a high risk reduction score. However, if additional data for the identified metric is available (e.g., reduce risk in particular area like HR or IT), recommendation engine 325 may assign higher rank to those application components from among detected application components 1, 2, . . . , N 375 that have metadata indicating a high risk reduction score and metadata indicating high functional coverage for the corresponding enterprise unit area (HR or IT).

It will be further appreciated that the ranking determined by recommendation engine 325 may change as the current implementation of client instance 315 changes; application components 1, 2, . . . , M 320 change and/or their implementation matures; or the goals and objectives of the enterprise (as identified based on the set monitored metrics) change.

FIG. 9 illustrates artifact 900 showing exemplary output data of ranked application components in accordance with one or more disclosed embodiments. Based on overall scores generated by recommendation engine 325 for the detected application components, a ranked list of applications or components 910 may be presented to a user of client instance 315. As shown in FIG. 9, respective scores for factors such as Agility 920, Risk 930, and Cost 940, may also be presented in association with respective applications or components 910. Further, as shown in FIG. 9, a Value Stream 950 and Function 960 of a standard framework (e.g., IT4IT), and a Value 970 (value proposition) corresponding to the application or component 910 may also be presented to the user. As shown in the exemplary list in FIG. 9, the "GRC" app having Risk 930 score of 10 is ranked highest, thereby indicting that the metric identified by the enterprise of client instance 315 may be to reduce risk of the enterprise (i.e., target risk score of 10). Further, the "ITSM Knowledge" having Agility score of 7 and Cost score of 9 is ranked second highest, thereby indicating that another metric identified by the enterprise may be to increase agility and/or reduce costs (i.e., target agility score of 7 and/or target cost score of 9). In the sample artifact 900 shown in FIG. 9, the "GRC" app may have an overall higher rank than the "ITSM Knowledge" app based on corresponding scores of one or more additional cells (e.g., "Implemented" cell 810, "Have Dependencies" cell 815, "Dependencies Implemented" cell 820, "Other customers Valued" cell 845, and the like) in the contextual matrices associated with the "GRC" and "ITSM Knowledge" apps.

Figure 10:
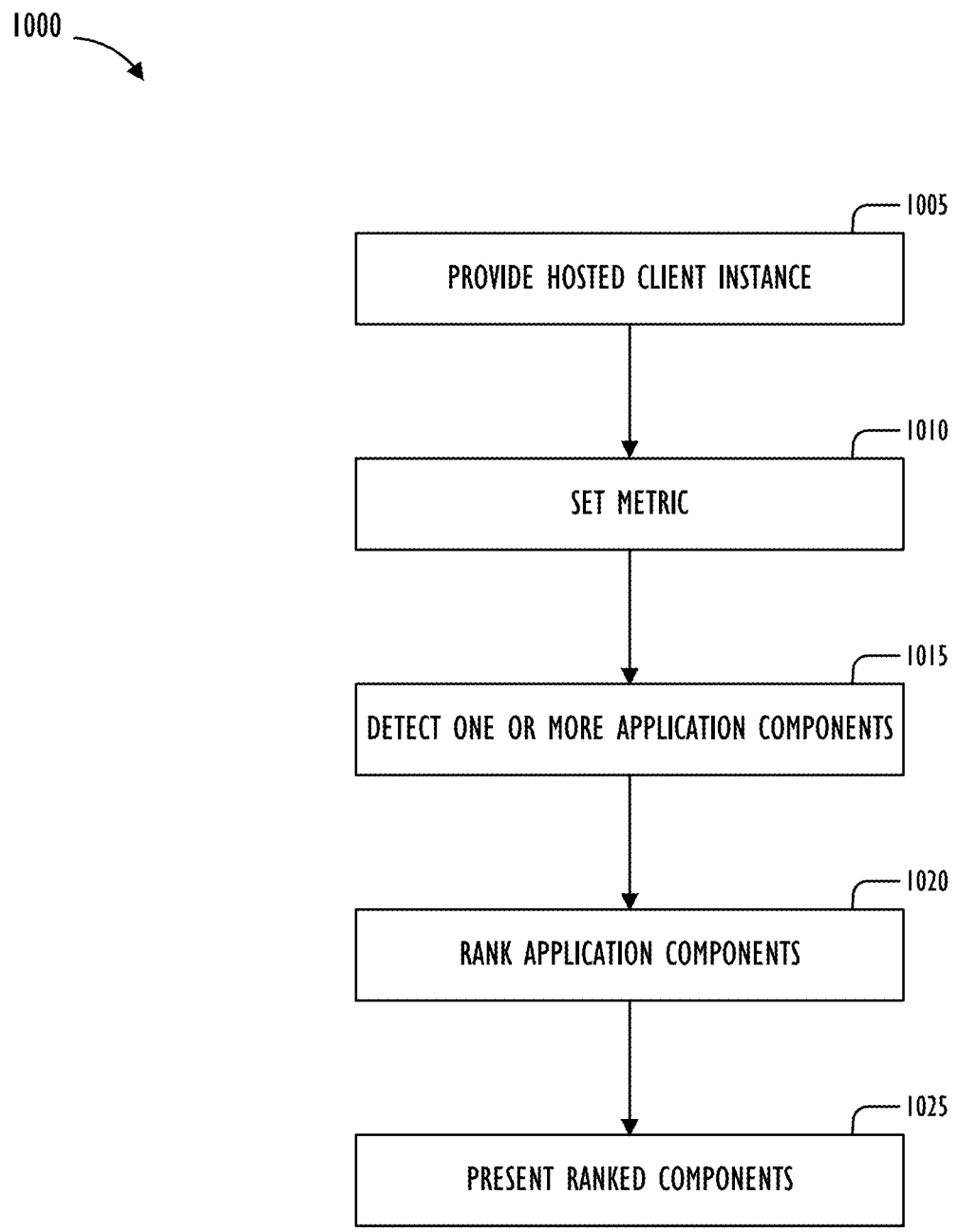
FIG. 10 shows flowchart 1000 illustrating operations of platform product recommendation system 300 in accordance with one or more disclosed embodiments.

FIG. 10 shows flowchart 1000 illustrating operations of platform product recommendation system 300 in accordance with one or more disclosed embodiments. At block 1005, cloud resources platform 310 may provide hosted client instance 315 so that hosted client instance 315 is communicatively coupled to and accessible from remote client device 305 via, e.g., a web browser. At block 1010, client instance 315 may identify a metric (e.g., a target risk score; a target cost score; a target agility score; a monitored metric such as an enterprise strategy or enterprise unit strategy entered using structured or unstructured text; a metric automatically detected based on user selection of a standardized capability in a structured industry-standard framework such as APQC PCF; and the like) to optimize an action associated with client instance 315. The action may be an existing action from action 1 350, action 2 355, . . . , action N 360 included in services/processes/functions 345 associated with client instance 315 or may be a new action to be added to services/processes/functions 345 based on the desired metric indicating a capability area the enterprise associated with client instance 315 desires to invest in.

At block 1015, recommendation engine 325 may detect one or more application components from among application components 1, 2, . . . , N 375 on resource server 370 based on the identified metric (or high-level goals or objectives of the enterprise) at block 1010. The components may be detected based on metadata associated with application components 1, 2, . . . , N 375 in product taxonomy 380. At block 1020, recommendation engine 325 may rank the application components detected at block 1015 based on predetermined logic and use cases, as explained above. In ranking the components, recommendation engine 325 may utilize contextual matrix data of each detected component generated by contextual matrix generation module 335. At block 1025, the ranked list of detected application components may be presented to a user on remote client device 305. The ranked list (e.g., as shown in FIG. 9) may be displayed on a display device. In one embodiment, based on the ranked list of application component, the user may decide which component to invest in next or which capability area to mature next.

Figure 11:
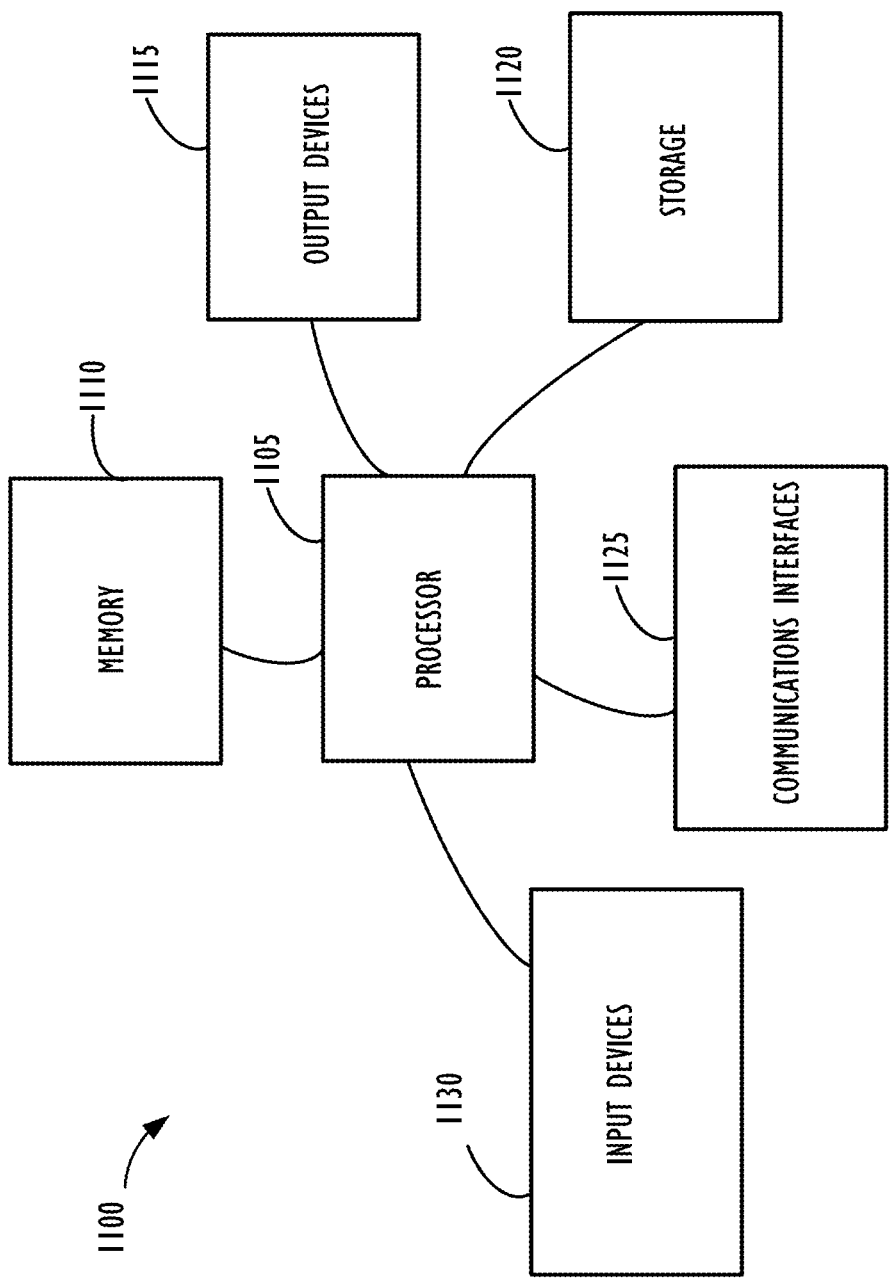
FIG. 11 illustrates high-level block diagram 1100 of a processing device (computing system) that may be used to implement one or more disclosed embodiments.

FIG. 11 illustrates high-level block diagram 1100 of a processing device (computing system) that may be used to implement one or more disclosed embodiments (e.g., cloud resources platform/network 110, client devices 104A-104E, server instances 114, client instance 208, data centers 206A-206B, remote client device 305, client instance 315, cloud resources platform 310, etc.). For example, computing device 1100 illustrated in FIG. 11 could represent a client device or a physical server device and include either hardware or virtual processor(s) depending on the level of abstraction of the computing device. In some instances (without abstraction) computing device 1100 and its elements as shown in FIG. 11 each relate to physical hardware and in some instances one, more, or all of the elements could be implemented using emulators or virtual machines as levels of abstraction. In any case, no matter how many levels of abstraction away from the physical hardware, computing device 1100 at its lowest level may be implemented on physical hardware. As also shown in FIG. 11, computing device 1100 may include one or more input devices 1130, such as a keyboard, mouse, touchpad, or sensor readout (e.g., biometric scanner) and one or more output devices 1115, such as displays, speakers for audio, or printers. Some devices may also be configured as input/output devices (e.g., a network interface or touchscreen display). Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 11, processing device 1100 includes a processing element such as processor 1105 that contains one or more hardware processors, where each hardware processor may have a single or multiple processor cores. In one embodiment, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 11, the processing elements that make up processor 1105 may also include one or more other types of hardware processing components, such as graphics processing units (GPUs), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more volatile devices such as random access memory (RAM). Non-volatile storage devices 1120 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1105. In one embodiment, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 1100 may comprise other components well known in the art, such as sensors, powers sources, and/or analog-to-digital converters, not explicitly shown in FIG. 11.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A computer system comprising:
    a display device;
    memory; and
    one or more hardware processors coupled to the memory, wherein the memory comprises computer instructions that, when executed by the one or more hardware processors, cause the computer system to:
        provide a hosted client instance over a network interface for communicatively coupling with a remote client device, the hosted client instance including a first plurality of application components for performing one or more actions associated with the hosted client instance;
        set a metric to optimize the one or more actions associated with the hosted client instance based on input from a user, wherein the metric indicates a target risk score, a target cost score, or a target agility score, or any combination thereof, and wherein the target risk score, the target cost score, and the target agility score indicate a desired priority ranking of optimizing the one or more actions in a corresponding factor area;
        detect, based on the metric, one or more application components from among a second plurality of application components available on a resource server;
        rank the detected one or more application components based on: (i) a maturity score of each of the detected one or more application components; and (ii) dependency data indicating an operational dependency of each of the detected one or more application components; and
        display the ranked one or more application components in a ranked order on the display device.

2. The computer system according to claim 1, wherein, for each of the detected one or more application components, the maturity score indicates a level of maturity of implementation of the respective application component.

3. The computer system according to claim 1, wherein the one or more application components are detected based on a product taxonomy that includes metadata for each of the second plurality of application components, the metadata including: (i) one or more of a risk score, a cost score, and an agility score provided by the respective application component; (ii) semantic data for semantically indicating a value proposition of the respective application component; and (iii) the dependency data indicating the operational dependency of the respective application component.

4. The computer system according to claim 3, wherein the metric is a monitored metric set by a user in an application on the hosted client instance.

5. The computer system according to claim 4, wherein the one or more application components are further detected based on semantic matching between the monitored metric and the semantic data of each of the second plurality of application components.

6. The computer system according to claim 3, wherein the computer instructions that, when executed by the one or more hardware processors, cause the computer system to set the metric further comprise computer instructions that, when executed by the one or more hardware processors, cause the computer system to:
    select a standardized capability of a structured framework to optimize the one or more actions that are associated with the hosted client instance and that correspond to the selected standardized capability.

7. The computer system according to claim 6, wherein, for each of the second plurality of application components, the metadata further includes one or more identifiers respectively corresponding to one or more standard capabilities of one or more structured frameworks covered by the respective application component, and wherein the one or more application components are further detected based on the selected standard capability.

8. The computer system according to claim 1, wherein the memory further comprises computer instructions that, when executed by the one or more hardware processors, cause the computer system to:
    rank the detected one or more application components further based on one or more of: (i) an implementation time of implementing the respective application component; (ii) a capability area of the metric and a capability area of the respective application component; and (iii) feedback data related to an effectiveness score of the respective application component.

9. The computer system according to claim 1, wherein the ranked order is determined based on feedback from other client instances on respective application components.

10. A method comprising:
- providing, with one or more hardware processors, a hosted client instance over a network interface for communicatively coupling with a remote client device, the hosted client instance including a first plurality of application components for performing the one or more actions associated with the hosted client instance;
- setting, with the one or more hardware processors, a metric to optimize the one or more actions associated with the hosted client instance based on input from a user, wherein the metric indicates a target risk score, a target cost score, or a target agility score, or any combination thereof, and wherein the target risk score, the target cost score, and the target agility score indicate a desired priority ranking of optimizing the one or more actions in a corresponding factor area;
- detecting, with the one or more hardware processors and based on the metric, one or more application components from among a second plurality of application components available on a resource server;
- ranking, with the one or more hardware processors, the detected one or more application components based on: (i) a maturity score of each of the detected one or more application components; and (ii) dependency data indicating an operational dependency of each of the detected one or more application components; and
- presenting, with the one or more hardware processors, the ranked one or more application components in a ranked order to a user.

11. The method according to claim 10, wherein, each of the detected one or more application components, the maturity score indicates a level of maturity of implementation of the respective application component.

12. The method according to claim 10, wherein the one or more application components are detected based on a product taxonomy that includes metadata for each of the second plurality of application components, the metadata including: (i) one or more of a risk score, a cost score, and an agility score provided by the respective application component; (ii) semantic data for semantically indicating a value proposition of the respective application component; and (iii) the dependency data indicating the operational dependency of the respective application component.

13. The method according to claim 12, wherein the metric is a monitored metric set by a user in an application on the hosted client instance.

14. The method according to claim 13, wherein the one or more application components are further detected based on semantic matching between the monitored metric and the semantic data of each of the second plurality of application components.

15. The method according to claim 12, wherein setting the metric further comprises selecting a standardized capability of a structured framework to optimize the one or more actions that are associated with the hosted client instance and that correspond to the selected standard capability.

16. The method according to claim 15, wherein, for each of the second plurality of application components, the metadata further includes one or more identifiers respectively corresponding to one or more standard capabilities of one or more structured frameworks covered by the respective application component, and wherein the one or more application components are further detected based on the selected standardized capability.

17. The method according to claim 10, further comprising ranking the detected one or more application components further based on one or more of: (i) an implementation time of implementing the respective application component; (ii) a capability area of the metric and a capability area of the respective application component; and (iii) feedback data related to an effectiveness score of the respective application component.

18. The method of claim 10, comprising determining the ranked order based on feedback from other client instances on respective application components.

19. A non-transitory computer-readable recording medium having stored thereon a program, the program comprising instructions that, when executed by one or more hardware processors, cause the one or more hardware processors to:
- provide a hosted client instance over a network interface for communicatively coupling with a remote client device, the hosted client instance including a first plurality of application components for performing one or more actions associated with the hosted client instance;
- set a metric to optimize the one or more actions associated with the hosted client instance based on input from a user, wherein the metric indicates a target risk score, a target cost score, or a target agility score, or any combination thereof, and wherein the target risk score, the target cost score, and the target agility score indicate a desired priority ranking of optimizing the one or more actions in a corresponding factor area;
- detect, based on the metric, one or more application components from among a second plurality of application components available on a resource server;
- rank the detected one or more application components based on: (i) a maturity score of each of the detected one or more application components; and (ii) dependency data indicating an operational dependency of each of the detected one or more application components; and
- present the ranked one or more application components in a ranked order to a user.

20. The non-transitory computer-readable recording medium according to claim 19, wherein for each of the detected one or more application components, the maturity score indicates a level of maturity of implementation of the respective application component.

* * * * *